United States Patent [19]

Hartdegen et al.

[11] 4,073,884

[45] Feb. 14, 1978

[54] PROMOTION OF FEED EFFICIENCY

[75] Inventors: Frank Joseph Hartdegen; Kamal Mohammad Abdo, both of Columbia, Md.

[73] Assignee: W. R. Grace & Co., New York, N.Y.

[21] Appl. No.: 749,001

[22] Filed: Dec. 9, 1976

Related U.S. Application Data

[63] Continuation-in-part of Ser. No. 726,632, Sept. 27, 1976, abandoned.

[51] Int. Cl.$^2$ ............................................. A61K 37/48
[52] U.S. Cl. ...................................................... 424/94
[58] Field of Search .......................................... 424/94

[56] References Cited

U.S. PATENT DOCUMENTS 3,868,448   2/1975   Hahn et al. ............................ 424/94

*Primary Examiner*—Sam Rosen
*Attorney, Agent, or Firm*—Philip M. Pippenger; William W. McDowell, Jr.

[57] ABSTRACT

Administration of a broth fraction having enzymatic activity obtained from the fermentation of *Streptomyces griseus* promotes effective and more efficient utilization of feed in animals.

7 Claims, No Drawings

PROMOTION OF FEED EFFICIENCY

This application is a continuation-in-part of application Ser. No. 726,632, filed Sept. 27, 1976 now abandoned.

BACKGROUND OF THE INVENTION

For many years, the poultry industry has been interested in feed additives and other methods of increasing the feed efficiency of chickens, turkeys and other forms of poultry. Because of the large amounts of feed consumed by poultry and the small margin of return on capital invested in raising chickens, turkeys, etc., even increases as small as 1% are meaningful economically. The term feed efficiency generally is based upon measuring the amount of weight gain in relation to the amount of feed consumed. Considerations such as feed efficiency also apply to other animals raised as food.

A variety of additives have been suggested for use in raising animal feed efficiency. Of some relevance to the present invention is U.S. Pat. No. 3,823,072 to Hooreman which teaches that a bacteria, *Streptomyces fradiae* produces substances having enzymatic activity. Specifically, the fermentation products of *S. fradiae* are useful in reducing the viscosity of intestinal mucous to a level between trypsin and chymotrypsin. Animals receiving feed containing the enzymatic extract are said to experience an increase in feed efficiency. Apparently the enzyme extract permits nutrients of digested food to more easily pass through the mucous membrane which covers the wall of the intestine. It is stated that excessive reduction in mucous viscosity should be avoided because in this situation a counterreaction is engendered, i.e. mucous production is actually stimulated. Hooreman further states that useful enzymes must not be inhibited by trypsin inhibitors.

DESCRIPTION OF THE INVENTION

In the present invention feed efficiency in animals, e.g. cattle, swine, poultry, etc. is increased by feeding controlled amounts of an enzyme fraction obtained by culturing *Streptomyces griseus* in a fermentation medium. The fraction is characterized as having a relatively small proteolytic activity — approximately ½ the Hooreman enzyme on an equal weight basis. The enzyme fraction possesses a high capacity to reduce mucous viscosity — approximately 3 times that of the Hooreman enzyme. The "mucinase" activity of the enzyme fraction is also inhibited by trypsin inhibitor.

In actual in vivo trials it has been found that the feed efficiency in pigs, chickens and turkeys is increased by using the enzyme fraction of *S. griseus* according to the present invention.

In U.S. Pat. No. 3,868,448 the use of an enzyme fraction obtained from fermentation by *S. griseus* is described and shown to be effective in preventing and/or curing bloat in ruminants. This is the same fraction employed in the present invention.

The *S. griseus* microorganism is sometimes referred to herein as NRRL 5747. A representative culture has been placed on deposit at the U.S. Department of Agriculture, Northern Regional Research Laboratory, 1815 North University St., Peoria, Ill. 61604, and is available from that depository under the conditions stated in Notice, 886 O.G. 638.

TAXONOMY OF NRRL 5747

This particular species of *Streptomyces griseus* forms loosely filamentous colonies with an abundance of long, branching aerial hyphae that segment into spiral chains of bead-like spores. Whole-cell hydrolysates of this strain contain the LL-form of diaminopimelic acid.

The physiological properties of NRRL 5747 are listed in Table I below, in comparison with 123 strains of other varieties of *Streptomyces griseus*.

Table 1

| Property | % of 123 known strains of S. griseus having the property | Response of NRRL 5747 |
| --- | --- | --- |
| Decomposition of | | |
| Adenine | 98 | + |
| Casein | 100 | + |
| Hypoxanthine | 100 | + |
| Tyrosine | 100 | + |
| Urea | 97 | + |
| Xanthine | 100 | + |
| Growth at | | |
| 50° | 0 | − |
| 45° | 0 | + |
| 40° | 33 | + |
| 10° | 100 | + |
| Survival of 50° for 8 hr | 99 | + |
| Nitrite from nitrate | 73 | − |
| Utilization of | | |
| Citrate | 99 | + |
| Lactate | 90 | + |
| Malate | 100 | + |
| Mucate | 0 | − |
| Oxalate | 0 | − |
| Succinate | 100 | + |
| Resistance to | | |
| Lysozyme | 1 | − |
| Salicylate | 2 | − |
| Oxidation of glucose | 98 | + |
| Fermentation of glucose | 0 | − |
| Hydrolysis of | | |
| Hippurate | 5 | − |
| Starch | 100 | + |
| Acid from | | |
| Adonitol | 43 | − |
| Arabinose | 63 | + |
| Dulcitol | 0 | − |
| Erythritol | 1 | − |
| Galactose | 99 | + |
| Glucose | 100 | + |
| Inositol | 15 | + |
| Lactose | 100 | + |
| Maltose | 100 | + |
| Mannitol | 97 | + |
| Mannose | 100 | + |
| Melibiose | 0 | + |
| α-Methyl-D-glucoside | 98 | + |
| Raffinose | 2 | − |
| Rhamnose | 31 | − |
| Sorbitol | 0 | − |
| Trehalose | 99 | + |
| Xylose | 10 | + |

PREPARATION AND CHARACTERIZATION OF ENZYME FRACTION

The fraction employed in the invention possesses enzymatic activity which is measured in relation to the effect of the fraction on gastric mucin. More precisely stated, one unit of enzyme activity is defined as that amount of enzyme fraction which, when added to 1 ml. of water, and that solution added to 1 ml. of Prepared Solution of Gastric Mucin (as hereinafter defined), reduces the viscosity of the said Prepared Solution of Gastric Mucin by 50% in 2 hours at 39° C.

The enzyme fraction obtained from fermentation of *Streptomyces griseus* NRRL 5747, and useful in the invention is characterized as follows:

(a) 1 g. of enzyme fraction represents about 500 units of enzyme activity as defined above, (b) said extract is insoluble in acidic acetone;
(c) centrifuged broth from the fermentation medium contains 0.3–1.0 units of enzyme fraction/mg. broth;
(d) storage of the dry enzyme fraction at 109° F. for 28 weeks or at 122° F. for 8 weeks results in less than 10% activity decrease.

The following examples illustrate without limiting the invention.

EXAMPLE 1

Culture Used to Produce the Enzyme Fraction

NRRL 5747, used for the production of the fraction is a Streptomycete soil isolate. The organism grows well on potato dextrose agar (PDA) and on Czapek Dox Agar (CDA). The organism is preserved in lyophilized ampuls.

FERMENTATION PRODUCTION PROCESS

A. Inoculum Stage

The spores from a two-week old agar slant (CDA) are suspended in 10 ml. of sterilized deionized water, which is used to to inoculate 1 liter of broth in a 4-liter aspirator bottle. The medium is composed of normal fermentation constituents, as shown in Table 2 below.

The inoculum bottle is incubated on a rotary shaker (250 RPM) at 25° C. for three days, and then checked for sterility before being "crossed" or transferred to production fermentor.

B. Production Stage

The production unit is a conventional 14-liter fermentor which contains 10 liters of broth and 1 liter of inoculum (both previously described in A above).

The operating conditions for the fermentation process are as follows:

10 liters of broth (see A above for constituents)
1 liter of inoculum
400 RPM
2.5 liters sterile air/minute passed through fermentor
Fermentation temperature, 25° C.

Harvest when peak enzyme titre has been attained in about 7 days.

Table 2

| | % |
|---|---|
| 87% Concentrate Feed[1/] | 5.0 |
| Cottonseed meal | 0.3 |
| Corn oil meal | 0.1 |
| Soybean Oil Meal (Solvent Extracted) 44% Protein | 0.1 |
| $K_2HPO_4$ | 0.1 |
| $MgSO_4 \cdot 7H_2O$ | 0.1 |
| $FeSO_4 \cdot 7H_2O$ | 0.0001 |
| $CaCO_3$ | 1.0 |
| NaCl | 0.05 |

Deionized Water, balance to make 100%
pH adjusted to 7.0 before sterilization
Antifoaming agent (silicone oil) 1 drop/100 ml.
30 minutes sterilization at 121° C. (250° F.), 15 psi

| [1/]87% Concentrate Feed | % of total medium |
|---|---|
| 1) Ground Corn Cobs | 0.3875 |
| 2) Dehydrated Alfalfa meal (17%) | 0.265 |
| 3) Ground Corn | 3.42 |
| 4) Dried Beet Pulp | 0.53 |
| 5) Cane Molasses on Soybean Millfeed (42% invert-CHO) | 0.1325 |
| 6) Protein Supplement[a/] | 0.265 |
| | 5.0000 |

| [a/]Protein Supplement | | |
|---|---|---|
| a) Soybean Meal (49–50% Protein) | 30 | lbs. |
| b) Dehydrated Alfalfa Meal (20% Protein) | 22.5 | " |
| c) Meat Meal (55% Protein) | 15 | " |
| d) Urea | 9.5 | " |
| e) Dicalcium phosphate | 5 | " |

Table 2-continued

| | | |
|---|---|---|
| f) Ground Limestone | 3.25 | " |
| g) Salt with Trace Minerals | 12.5 | " |
| h) Vitamin ADE premix[i/] | .65 | " |
| | 100 | lbs. |

[i/]Vitamin Premix
4,500,000 units Vitamin A per lb. premix
1,000,000 units Vitamin D per lb. premix
500 units Vitamin E per lb. premix

ISOLATION OF THE ENZYME FRACTION

The fraction is recovered by utilizing the fact that it is insoluble in slightly acidic acetone. Thus, the following steps are undertaken. First, the fermentation broth is centrifuged to remove all insoluble material including cells. This centrifuged broth is a solution of the acetone-insoluble enzyme fraction and may be used to improve feed efficiency in poultry and other animals according to the invention. However, the broth is dilute and contains only 0.3–1.0 units of enzyme fraction/ml. of broth. It would be necessary to handle large volumes of broth to provide the activity level described below. Accordingly the use of broth is not a preferred embodiment of the invention, and it is advantageous to further process the broth to remove water. Therefore after centrifugation, the pH of the supernatant solution is then adjusted to 5.5 by the addition of glacial acetic acid. The fraction containing enzymatic activity is precipitated by adding 3 liters of acetone per one liter of solution. Optimum yield is obtained by using cold acetone and cooling the suspension to $-20°$ for 18 hours. The acetone insoluble fraction is separated by filtration. The resultant solid fraction is then washed with dry acetone to remove residual water. The enzyme fraction can also be obtained by any standard biochemical techniques, such as ammonium sulfate precipitation, ion exchange or gel filtration chromatography, lyophilization, etc. Finally the fraction is dried in vacuo at 25° C. to remove acetone. It is stable at room temperature. One gram of the dried product so prepared generally represents about 500 units of enzyme activity.

MEASUREMENT OF ENZYMATIC EFFECT ON MUCIN VISCOSITY

A. Substrate

Prepare a 7.5% (w/w) solution of gastric mucin, bacteriological in 0.2 M phosphate buffer, pH 7.0, by heating the suspension to around 50° C. until it dissolves, then cooling to 25° C.

B. Enzyme

The test enzyme solution can be either centrifuged fermentation broth (per Example 1) used directly, or a solution of the dry isolated enzyme fraction; 2 to 3 mg/ml is a good level if a single level assay is being done.

C. Hydrolysis

Pipette 1.0 ml. of substrate into each of two 25 ml. Erlenmeyer flasks. Pipette 1.0 ml. test solution into one of the flasks (test) and 1.0 ml. water into the other (control). Place flasks into a 39° C. water bath and shake for 2 hours.

D. Assay

Draw the sample into a 1.0 ml. constricted tip graduated pipette to the 0 mark. Release vacuum and measure the time in seconds required for the solution to drain to the 0.8 ml. mark. Do for both test, control and also for water (blank). NOTE: If drain time for control is less than 13 sec., prepare fresh substrate and repeat assay. This method gives accurate and reproducible results; however, any standard method of measuring viscosity, e.g., Ostwald viscositimeter with a constant temperature bath, is suitable.

E. Calculation of Enzyme Activity

First, calculate the per cent decrease in viscosity of mucin caused by enzyme activity:

$$\frac{\%\text{Viscosity}}{\text{Decrease}} = \frac{(\text{Time of Control}) - (\text{Time of Sample})}{(\text{Time of Control}) - (\text{Time of Blank})} \times 100$$

Second, calculate the units of enzyme activity in the test sample. One unit of activity is defined as the amount of enzyme or enzyme fraction which, when added to 1.0 ml. of water, and that solution added to 1.0 ml. of Prepared Solution of Gastric Mucin (as hereinafter defined), reduces the viscosity of the said Prepared Solution of Gastric Mucin by 50% in 2 hours at 39° C. The enzyme activity units are most accurately determined by varying the concentration of enzyme fraction in the test solution until a 50% assay result is obtained. However, in any assay where the per cent decrease as determined above is between 10% and 90%, the units can be calculated as given below.

The viscosity of a mucin solution is not a linear function of the mucin concentration; therefore, the per cent viscosity decrease of a mucin solution is not a linear function of the amount of enzyme activity present. Therefore, the units of enzyme activity must be determined from the quadratic equation of the hyperbolic function relating degree of hydrolysis to viscosity change. To simplify calculations, the units as a function of per cent viscosity decrease are given in Table 3 below.

Results are expressed in units/ml. for spun fermentation broths or units/mg. for solutions prepared from the dry enzyme fraction.

Table 3

| % Viscosity Decrease | Enzyme Activity Units/ml. | % Viscosity Decrease | Enzyme Activity Units/ml. |
| --- | --- | --- | --- |
| 90 | 9 | 60 | 1.6 |
| 88 | 7 | 58 | 1.5 |
| 86 | 6 | 56 | 1.4 |
| 84 | 5.4 | 54 | 1.2 |
| 82 | 4.8 | 52 | 1.1 |
| 80 | 4.3 | 50 | 1.0 |
| 78 | 4.0 | 48 | 0.9 |
| 76 | 3.6 | 46 | 0.8 |
| 74 | 3.2 | 44 | 0.7 |
| 72 | 3.0 | 42 | 0.6 |
| 70 | 2.7 | 40 | 0.5 |
| 68 | 2.4 | 35 | 0.4 |
| 66 | 2.2 | 30 | 0.3 |
| 64 | 2.0 | 20 | 0.2 |
| 62 | 1.8 | 10 | 0.1 |

CHARACTERISTICS OF ENZYME FRACTIONS

A. Yield

Typical fermentations give 2 to 6 gm. of the dry isolated fraction having enzymatic activity per liter of centrifuged broth. The activity range is between 0.3 and 1.0 units/mg.

B. In vitro Testing

The above assay procedure uses bateriological mucin as a substrate since its low cost makes it suitable for routine work. For an in vitro test, the enzyme activity was measured using as substrate a solution of bovine submaxillary mucin. With this substrate, the per cent viscosity decrease was four times that achieved using bateriological mucin on a per mg. basis.

C. Stability

The degree of denaturation for the enzyme fraction in dry form was determined as a function of time and temperature (i.e., storage stability). Storage at 43° C. (109° F.) for 28 weeks or at 50° C. (122° F.) for 8 weeks resulted in less than a 10% activity decrease.

EXAMPLE 2

Protease Activity

This example illustrates the protease activity of the enzyme fraction of the present invention in comparison with other enzymes. The procedure employed in determining protease activity is as follows.

SUBSTRATE 1.0% Casein in 0.1 M sodium phosphate buffer adjusted to pH 7.0. (This solution should be heated with stirring until Casein is completely dissolved, then cool.) (Freeze in small vials.)

REAGENT 5.0% Trichloroacetic acid in d $H_2O$ (w/v). "TCA"

STANDARD 0.1 mg ficin/1.0 ml d $H_2O$ (enz. solution)

PROCEDURE 9.0 ml substrate 1.0 ml enzyme solution

Combine in 25 ml Erlenmeyer flasks and place in the shaker bath at 37° C.

Take 1.0 ml samples at 10 min. intervals (include a zero time sample) and place in centrifuge tubes containing 3.0 ml TCA, to quench the reaction.

Let all samples stand for approximately 20 minutes, then centrifuge at 19,000 rpm for 35 minutes.

Pour off clear layer and read the optical density by spectrophotometer at 280 m$\mu$ using water as a reference.

CALCULATIONS

Protease Units = OD*/min. $\times 10^3$
*OD sample — OD zero time

The following table sets forth the protease activity of the enzymes.

Table 4

| Sample | O.D. (15 min.) | O.D. 15 min. (Inhibitor[1] Present) | O.D. (30 min.) | O.D. 30 min. (Inhibitor[1] Present) |
| --- | --- | --- | --- | --- |
| 1. Fradiase[3] (1.0 mg/ml) | 0.169 | 0.172 | 0.386 | 0.480 |
| 2. Fradiase (2.5 mg/ml) | 0.550 | 0.578 | 1.03 | 1.02 |
| 3. Fradiase (5.0 mg/ml) | 0.912 | 0.860 | 1.31 | 1.24 |
| 4. Mucinase[2] (2.5 mg/ml) | 0.301 | 0.320 | 0.486 | 0.478 |
| 5. Trypsin (0.5 mg/ml) | 0.368 | — | 0.463 | — |
| 6. Trypsin (2.5 mg/ml) | 0.502 | — | 0.548 | — |
| 7. Chymotrypsin (2.5 mg/ml) | 1.09 | — | 1.39 | — |

Table 4-continued

| Sample | O.D. (15 min.) | O.D. 15 min. (Inhibitor[1] Present) | O.D. (30 min.) | O.D. 30 min. (Inhibitor[1] Present) |
|---|---|---|---|---|
| 8. Maxatase (2.5 mg/ml) | 0.341 | — | 0.606 | — |

[1]Soybean trypsin inhibitor was present in amounts by weight equal to the weight of enzyme employed.
[2]Mucinase is the enzyme fraction of the present invention prepared as described above.
[3]Fradiase is the preferred enzyme as taught by Hooreman in U.S. Pat. No. 3,823,072.

In runs 1, 2 and 3 the protease activity of fradiase (Hooreman) was not inhibited by the presence of soybean trypsin inhibitor. Similarly run 4 demonstrates that the enzyme fraction of the present invention is also not inhibited by the presence of the trypsin inhibitor. Comparison of the optical density measurements of runs 2 and 3 with run 4 indicates that on a weight basis the proteolytic activity of fradiase is approximately twice that of the enzymatic fraction of the invention.

EXAMPLE 3

Effect of Protease Inhibitor on Mucin Viscosity

The per cent decrease in mucin viscosity due to enzymatic activity was determined as described above for samples of mucinase (the enzymatic fraction of the invention) and fradiase. Several of the samples contained soybean trypsin inhibitor. In each run the average drain time for two samples ($T_1$ and $T_2$) was taken. The "% Viscosity Decrease" was calculated using the formula set forth above in Part E of the section entitled "Measurement of Enzymatic Effect on Mucin Viscosity." In the formula the "Time of Blank" shown in the denominator was 1.6 seconds. Units of enzyme activity in the sample were determined by consulting Table 3 above. The results are set forth in the following table.

Table 5

| Sample | Amount | $T_1$ | Time $T_2$ | Avg. | Viscosity Decrease | Units/ mg. |
|---|---|---|---|---|---|---|
| 1. Mucinase | 3.0 mg. | 7.3 | 6.3 | 6.5 | 67.1% | 2.3/3 = 0.77 |
| 2. Mucinase & Soybean Trypsin Inhibitor | 3.0 mg.* | 10.2 | 14.6 | 12.4 | 27.5% | 0.27/3 = 0.09 |
| 3. Fradiase | 0.3 mg. | 12.5 | 10.3 | 11.4 | 34.2% | 0.34/0.3 = 1.10 |
| 4. Fradiase | 3.0 mg. | 9.2 | 10.6 | 9.9 | 44.3% | 0.7/3.0 = 0.23 |
| 5. Fradiase | 30.0 mg. | 5.3 | 5.7 | 5.5 | 73.8% | 3.1/30 = 0.10 |
| 6. Fradiase & Soybean Trypsin Inhibitor | 0.3 mg.* | 9.2 | 11.1 | 10.2 | 42.3% | 0.6/0.3 = 2.0 |
| 7. Fradiase & Inhibitor | 3.0 mg.* | 9.8 | 10.8 | 10.2 | 42.3% | 0.6/3 = 0.2 |
| 8. Fradiase & Inhibitor | 30.0 mg.* | 11.0 | 10.6 | 10.8 | 38.3% | 0.43/30 = 0.01 |
| 9. Water & Mucinase Fraction (Control) | 3.0 mg. | 19.0 | 14.0 | 16.5 | | |

*In runs 2, 6, 7 and 8 trypsin soybean inhibitor was employed on an equal weight basis with the amount of enzyme.

From Table 5 it is apparent that soybean trypsin inhibitor seriously affected the activity of "mucinase", i.e., comparison of runs 1 and 2 shows that the activity was reduced from 67.1% to 27.5%. For fradiase, comparison of runs 3, 4, 5 with 6, 7 and 8 indicates that enzyme activity was not greatly decreased by the inhibitor. Run 1 shows that mucinase contains approximately 0.77 units of enzyme activity for reducing mucin viscosity. By contrast run 4 indicates that fradiase contains about 0.23 units per mg. of viscosity reducing activity.

EXAMPLE 4

Chicken Feeding Trial

A chicken trial of two groups of 60 birds each (4 pens of 15 birds for the first four weeks and 2 pens of 30 birds for the second four weeks) was run for 56 days using a commercial diet consisting of 20% crude protein. For one group, the enzyme fraction in the form of a dry powder was added at a level of 0.04% of the feed. Approximately 0.2 units of enzyme activity were employed for each gram of feed. For the other group (control), no additives were added to the diet.

Feed and water were offered ad libitum. Weight gain and feed efficiency was determined. After 56 days, the results were:

| | | | Improvement over Group II (Control) |
|---|---|---|---|
| Group I 0.04% enzyme faaction | | | |
| Average Daily Gain: | 35.1 | gm | 4.3 % |
| Feed Efficiency: | 2.26 | | 3.42 % |
| Group II, Control | | | |
| Average Daily Gain: | 33.7 | gm | — |
| Feed Efficiency: | 2.34 | | — |

EXAMPLE 5

Chicken Feeding Trial

A second trial was conducted similar to Example 4, except 45 chickens per treatment were used, two levels of the enzyme fraction were used, and the additive was withdrawn after 49 days. From the 49th to 56th days, the birds were fed equal amounts of identical commercial rations. After 56 days, the results were:

| | | | Improvement over Group III (Control) |
|---|---|---|---|
| Group I, 0.044% enzyme fraction: | | | |
| Average Daily Gain: | 35.9 | gm | 1.9 % |
| Feed Efficiency: | 2.50 | | 2.7 % |
| Group II, 0.022% enzyme fraction: | | | |
| Average Daly Gain: | 36.0 | gm | 2.2 % |
| Feed Efficiency: | 2.49 | | 3.1 % |
| Group III, Control | | | |
| Average Daily Gain: | 35.2 | gm | — |
| Feed Efficiency: | 2.57 | | — |

EXAMPLE 6

Chicken Feeding Trial

A third trial was carried out following the procedure of Example 4 except that the birds were assigned directly to greenhouse pens as follows: 6 pens of 50 birds each per treatment. The level of enzyme fraction was 0.01% rather than 0.04%. The results were as follows:

Table 6

| ADG* | 14th Day | % Increase | 27th Day | % Increase | 42nd Day | % Increase | 51st Day | % Increase | Totals to Date | % Increase | 56th Day | % Increase | Totals/Trial | % Increase |
|---|---|---|---|---|---|---|---|---|---|---|---|---|---|---|
| Control | 16.00 | — | 29.98 | — | 41.05 | — | 46.76 | — | 33.45 | — | 46.98 | — | 33.67 | — |
| Mucinase | 16.67 | 4.0 | 31.11 | 3.63 | 42.61 | 3.66 | 49.40 | 5.34 | 34.95 | 4.29 | 48.09 | 2.31 | 35.11 | 4.10 |
| Fradiase FE** | 16.73 | 4.4 | 30.09 | 0.37 | 42.79 | 4.07 | 47.61 | 1.79 | 34.31 | 2.51 | — | — | — | — |
| Control | 1.67 | — | 2.06 | — | 2.59 | — | 2.94 | — | 2.32 | — | 3.28 | — | 2.34 | — |
| Mucinase | 1.64 | 1.8 | 2.02 | 1.94 | 2.50 | 3.47 | 2.80 | 4.76 | 2.24 | 3.24 | 3.16 | 3.66 | 2.26 | 3.42 |
| Fradiase | 1.61 | 3.6 | 2.07 | 0.48 | 2.49 | 3.86 | 2.90 | 1.36 | 2.27 | 1.94 | — | — | — | — |

*ADG = Average Daily Weight Gain
**FE = Feed Efficiency

|  |  | Group II (Control) |
|---|---|---|
| Group I, 0.01% enzyme fraction: |  |  |
| Average Daily Gain: | 35.2 gm | 2.3 % |
| Feed Efficiency: | 2.55 | 3.4 % |
| Group II, Control |  |  |
| Average Daily Gain: | 34.4 gm | — |
| Feed Efficiency: | 2.64 | — |

EXAMPLE 7

Turkey Feeding Trial

Twenty-four turkeys were divided into two groups of 12 each. A first group was fed ad libitum water and a commercial turkey ration containing 0.01% by weight of enzymatic fraction. To insure proper mixing, the enzymatic fraction was admixed with a small amount of feed to form a premix. The premix was then diluted with untreated quantities of turkey ration. In the finished ration, the dosage level was about 0.5 units of enzyme activity per gram of ration. The trial was continued 4 weeks. Water and feed (Minus enzyme fraction) were also fed ad libitum to the control group during the 4 weeks of the trial.

Average daily weight gain and feed efficiency were measured weekly after the second week with the following results:

|  | Average Daily Weight Gain (gms) | | | Feed Efficiency | | | Number of Birds |
|---|---|---|---|---|---|---|---|
| Period (Weeks) | 2 | 3 | 4 | 2 | 3 | 4 |  |
| Diet 1 Basal Ration | 15.48 | 20.26 | 25.94 | 1.45 | 1.63 | 1.70 | 12 |
| Diet 2 Basal Ration + 0.01% enzyme fraction | 16.68 | 21.18 | 26.15 | 1.40 | 1.57 | 1.67 | 12 |

EXAMPLE 8

Comparison of "Mucinase" vs. "Fradiase" Activity In Chickens

To compare mucinase and fradiase levels in vivo, a chicken trial (8 weeks) was conducted as in Example 4. This trial consisted of 60 birds (4 pens of 15 birds for the first four weeks and 2 pens of 30 birds each for the second four weeks) per dietary treatment. The treatments consisted of a control diet and two rations containing 0.04% by weight of fradiase or mucinase. The diets were kept refrigerated prior to use.

Feed and water was offered ad libitum. Weight gain and feed efficiency were measured in approximately two week periods. In the data set forth in the following table, a 51-day set of totals is reported as additional fradiase was not available to complete a 56-day trial. The control and mucinase treatments were then carried out to 56 days (8 weeks) and totals for these are presented.

EXAMPLE 9

Swine Feeding Trial

A comparative study using two lots of 10 pigs each (total of 20 animals) was run for 42 days. During this period the animals were fed on an ad libitum basis. The control group of 10 pigs was fed a commercial ration containing at least 18% crude protein, 3.5% crude fat, 4.5% crude fiber, penicillin (50 grams/ton), 0.011% sulfamethazine and chloratetracycline (100 grams/ton). To evaluate the present invention the other group of 10 pigs received the same ration containing in addition 0.01% by weight of the enzyme fraction of the invention. The fraction was mixed into the ration as a dry powder.

The study was begun shortly after weaning when the pigs were about 4 weeks old. It has been found that the efficacy of the enzyme fraction is increased if use is begun as soon as possible after weaning.

During the study three pigs in the control group died. All pigs in both groups contracted "scours" although the symptoms were much less severe in the group receiving the enzyme fraction.

The results of the comparative study are set forth below. Data for Final Weight, Gain, Daily Gain, Feed Intake and Feed Efficiency are averages based on the surviving pigs without regard for the data from the three pigs that died.

|  |  | Control | Enzyme Fraction Group |
|---|---|---|---|
| Initial Number of Animals |  | 10 | 10 |
| Initial Weight | (lbs/head) | 23.6 ± 0.6 | 23.7 ± 1.6 |
| Final Weight | (lbs/head) | 67.0 | 89.1 |
| Gain (total for 42 days - lbs/head) |  | 43.4 ± 0.01 | 65.5 ± 1.7 |
| Daily Gain | (lbs/head) | 1.03 ± 0.01 | 1.56 ± 0.04 |
| Feed Intake | (lbs/head) | 114.9 ± 6.0 | 144.6 ± 3.9 |
| Feed Efficiency | (Feed Intake/Gain) | 2.65 ± 0.21 | 2.21 ± 0.04 |
| Mortality (%) |  | 30 | 0 |

By comparing "Feed Efficiency" for the two groups, it is clear that the pigs fed with the enzyme fraction used about 0.44 lbs. of feed less than the control group for each pound gained.

ADMINISTRATION OF ENZYME FRACTION

The following table sets forth daily amounts of enzyme fraction for administration to various types of animals to obtain increased feed efficiencies.

|  | Swine | Chickens | Turkeys | Cattle |
|---|---|---|---|---|
| Average Daily Amount | 40–400 units | 2–20 units | 4–40 units | 160–1600 units |

The daily feeding level for other animals is increased over the level used for chickens to reflect the larger size of turkeys, pigs, cattle, etc. Here again, the above ranges are average levels and reflect the fact that lower levels will be fed initially with more fraction being fed as the animal grows and eats more. For example, for turkeys it is preferred to feed about 6–15 units per day for the first 3 weeks following hatching. For pigs it is preferred to feed about 80–300 units per day for the first 4 weeks after the animal is weaned. For cattle the corresponding level is about 320–1200 units per day for the first 7 weeks after weaning.

Another factor contributing greatly to the success of the feeding program is to begin feeding the enzyme fraction as soon as possible. For chickens it has been found that delays of a week, for example, greatly decreased the improvement in weight gain. Therefore, for birds such as chickens and turkeys feeding of the enzyme fraction should begin 1–2 days after hatching. For pigs, cattle and similar animals, the fraction should be administered within 1–7 days after the animal is weaned, and continuously thereafter until the desired weight level is obtained.

The 2–20 daily unit range for chickens is an average taking into account that chicks would only be expected to eat about 100 grams of food during their first week. As the bird grows the amount of feed and enzyme fraction consumed will increase. A preferred average daily range would be from 4–10 units during the first several weeks after hatching. The chicks are generally fed a powdered "mash". In preparing the mash a powdered premix generally sold in 20-pound bags in employed. From 0.05–0.4 pounds of the enzyme fraction should be employed for every 20 pounds of the premix, i.e. the ratio by weight of enzyme fraction to premix (enzyme fraction plus all other materials) is from 0.0025 to 0.0200. As the chicks mature they are switched to "crumbles". Here again the 0.05–0.4 pound range is satisfactory.

In forming premix, the enzyme fraction is mixed with vitamins, minerals, antibiotics and other additives together with an orally ingestible carrier such as a feed material, dried grains, alfalfa, corn meal, citrus meal, fermentation residues, ground oyster shells, wheat shorts, molasses solubles, corn cob meal, antibiotic mycelia, vermiculite, and the like. The premix can be further processed by conventional techniques to form crumbles, e.g. by blending in liquids to form a paste, drying and crushing.

For animals other than chickens, premixes can also be employed. Such premixes are prepared as described above and are generally sold in bags averaging 20–50 pounds. On a weight basis the premixes should contain the following amounts of enzyme fraction:

|  | Pigs | Cattle | Turkeys |
|---|---|---|---|
| Amount per lb. of Premix (%) | 0.1–1.0 | 0.1–1.0 | 0.1–1.0 |

The enzyme fraction in powder form can also be added directly to the animal feed in the following amounts on a weight basis:

|  | Chickens | Pigs | Cattle | Turkeys |
|---|---|---|---|---|
| Amount per lb. of Feed (%) | 0.001–0.1 | 0.001–0.1 | 0.001–0.1 | 0.001–0.1 |

Feeds commonly used for poultry, pigs, cattle, and other animals are suitable for the present invention. These would include for example corn meal, alfalfa, dried grains (e.g. wheat, corn, oats, barley, rye, etc.), citrus meal, wheat shorts, and molasses solubles. It should be noted that because of the protease inhibiting action of trypsin inhibitors, certain materials, e.g. soybean meal, soya grits, etc., should not be combined with the enzymatic fraction unless they are first heat-treated to deactivate the inhibitor.

What is claimed is:

1. A method of increasing the feed efficiency of pigs, chickens and turkeys comprising administering an effective amount of an enzyme fraction obtained by culturing *Streptomyces griseus* strain NRRL 5747 in a fermentation medium to obtain a fraction having the following characteristics:
    (a) 1 g. of the enzymatic fraction represents about 500 units, 1 unit being that amount of enzyme fraction which when dissolved in 1 ml. of water reduces the viscosity of 1 ml. of prepared gastric mucin by 50% in 2 hours at 39° C.;
    (b) said fraction is insoluble in acidic acetone;
    (c) centrifuged broth from the fermentation medium contains 0.3–1.0 units of enzyme fraction/mg. broth;
    (d) storage of the dry enzyme fraction at 109° F. for 28 weeks or at 122° F. for 8 weeks results in less than 10% activity decrease.

2. A method as in claim 1 wherein the fraction is administered in the form of a premix suitable for addition to animal feed.

3. A method as in claim 1 wherein the fraction is combined with the animal feed.

4. A method as in claim 1 wherein the fraction is administered to chickens.

5. A method as in claim 1 wherein the fraction is administered to turkeys.

6. A method as in claim 1 wherein the fraction is administered to pigs.

7. A method of increasing the feed efficiency of pigs, chickens and turkeys comprising administering an effective amount of a broth obtained by culturing *Streptomyces griseus* strain NRRL 5747 in a fermentation medium.

* * * * *